United States Patent [19]

McDonald

[11] Patent Number: 4,961,093
[45] Date of Patent: Oct. 2, 1990

[54] PHOTO-PROCESSING DEVICE

[75] Inventor: Frank W. McDonald, Toronto, Canada

[73] Assignee: Black Photo Corporation, Ontario, Canada

[21] Appl. No.: 462,038

[22] Filed: Jan. 8, 1990

[30] Foreign Application Priority Data

Jan. 10, 1989 [CA] Canada ................................ 587887

[51] Int. Cl.⁵ .......................................... G03B 29/00
[52] U.S. Cl. ...................................... 355/29; 355/60; 355/65; 355/66; 355/28
[58] Field of Search ....................... 355/28, 29, 60, 65, 355/66

[56] References Cited

U.S. PATENT DOCUMENTS

| | | | |
|---|---|---|---|
| 3,540,807 | 11/1970 | Minikes | 355/60 |
| 3,722,340 | 3/1973 | Kobayashi | 355/29 |
| 4,229,098 | 10/1980 | Schmoker | 355/60 |
| 4,481,541 | 11/1984 | Ioannidis et al. | 355/29 |
| 4,566,785 | 1/1986 | Takenouchi | 355/72 |
| 4,655,583 | 4/1987 | Kitai et al. | 355/29 |
| 4,723,153 | 2/1988 | Kogane | 355/29 |

FOREIGN PATENT DOCUMENTS

| | | |
|---|---|---|
| 0252160 | 1/1988 | European Pat. Off. . |
| 2729149 | 1/1979 | Fed. Rep. of Germany . |
| 2818619 | 10/1979 | Fed. Rep. of Germany . |
| 3023414 | 1/1982 | Fed. Rep. of Germany . |
| 3028676 | 2/1982 | Fed. Rep. of Germany . |

Primary Examiner—Monroe H. Hayes
Attorney, Agent, or Firm—Nixon & Vanderhye

[57] ABSTRACT

An apparatus for forming enlarged exposures of film negatives is provided. The apparatus is adapted to be coupled to the housing of a conventional photo-processing machine without requiring permanent modification of the conventional machine. The apparatus includes a pair of magazines, one magazine of which houses a roll of unexposed paper. The unexposed paper is fed from the one magazine, vertically through the apparatus and into the other magazine. A mirror placed in the conventional machine, reflects a focussed light beam that has passed through a negative. The light beam is directed into the apparatus so that it impinges on a portion of the unexposed paper passing therethrough thereby forming an exposure of the negative on the paper. Drive motors automatically advance the paper from the one magazine to the other, upon exposure of the negative on the paper. A cutter is provided for cutting the paper when a complete reel of negatives has been exposed.

23 Claims, 8 Drawing Sheets

PHOTO-PROCESSING DEVICE

The present invention relates to a photo-processing apparatus.

Photo-processing devices are well known in the art and are typically designed to form exposures of negatives, the exposures being of a pre-determined size. Although these devices operate satisfactorily to form high quality exposures of the negatives, a problem exists in that often it is desired to form different size exposures of a negative. Separate photo-processing devices can be purchased to make the various different size exposures, however, this method of making the different size exposures is expensive due to the high cost of each photo-processing device.

It is therefore an object of the present invention to obviate or mitigate the above disadvantages.

According to the present invention there is provided an apparatus adapted to be coupled to a photo-processing device, said photo-processing device for forming exposures of negatives of a pre-determined size, said apparatus comprising:

a housing receiving a supply of unexposed paper;
drive means for advancing said paper through said housing upon exposure of a negative thereon; and
reflection means positioned in said photo-processing device, said reflection means receiving a focussed light beam after said light beam has passed through a negative and directing said focussed light beam into said housing and onto said paper to form an exposure of said negative of a size different than said pre-determined size.

In another aspect of the present invention there is provided a photo-processing device capable of forming different size exposures of a negative comprising:

a light source for generating a light beam to be directed through a negative;
a housing receiving said light beam after it has passed through said negative, said housing also receiving supplies of first and second unexposed paper, one supply of paper having larger dimensions than the other;
focussing means receiving said light beam after it has passed through said negative and being operable in first and second modes;
reflection means movable from an operative position to an inoperative position, in said inoperative position, said focussing means being operative in said first mode so that said light beam is focussed directly onto said first supply of paper to form an exposure of a first size of said negative thereon and in said operative position, said focussing means being operative in said second mode, said reflection means reflecting said focussed light beam onto said second supply of paper to form an exposure of said negative of a second size thereon; and
drive means operable to advance said first supply of paper through said housing in said first mode and to advance said second supply of paper through said housing in said second mode upon exposure of a negative thereon.

Preferably, the first supply of paper is disposed directly beneath the light source and the reflection means comprises a single angled mirror which alters the direction of the light beam by approximately 90°. It is also preferred that the second supply of paper is larger than the first supply of paper and advances vertically through the device. Preferably, the focussing means comprises a pair of interchangeable focussing lenses, each lens focussing the light beam in a manner to form a focussed and proper size exposure of the negative on the respective supply of paper.

Preferably, the drive means includes a plurality of roller pins and guides disposed within the housing along the path for advancing the paper through the housing.

The present device provides advantages in that by placing a single mirror in an existing photo-processing device and by exchanging the focussing lens, the retro-fit housing receiving the second supply of paper allows exposures of negatives of a different size to be made without physically altering the original photo-processing device. This operation reduces the costs normally involved when forming enlarged exposures of negatives. Furthermore, since the original photo-processing device is not permanently altered when coupling the housing of the apparatus thereto, maintenance and repair contracts for the conventional device are typically not affected.

An embodiment of the present invention will now be described by way of example only with reference to the accompanying drawings in which.

Referring to the Figures, a photo-processing device is generally shown and indicated by reference numeral 10. The device 10 shown is a conventional photo-processor or printer such as that manufactured by GRETAG under Model number 3140. The GRETAG device 10 includes a "T"-shaped housing 12, the upper surface of a portion of which defines a table 14. A feed reel 16 positioned at one end of the table 14 is supported on a shaft 18 projecting from the housing 12. A take-up reel 20 is positioned at the other end of the table 14 and is supported on a shaft 22. The reel 16 holds a strip of film 24 comprising a plurality of negatives 24a that are to be exposed. The table 14 supports the strip of film 24 as it is unwound from the reel 16 and wound by the reel 20.

The housing 12 supports a pair of light sources 30 and 31 respectively, both of which communicate with a computer (not shown) provided in the housing 12. The light sources 30 and 31 are disposed above the table 14 and allow the strip of film 24 to pass thereunder as the film is wound between the two reels 16, 20.

A pair of apertures 32 and 33 are provided in the table 14 with each aperture being located beneath one of the light sources 30, 31 respectively. The apertures permit the light beam generated by their respective light source to pass into the housing 12. A film scanning device 34 is disposed in the housing 12 below the aperture 30 and receives the light beam generated by the light source 30. The scanning device 34 is also in communication with the computer and provides color and density information to the computer for each of the scanned negatives 24a on the strip of film 24.

A magazine 40 is removably coupled to one end of the housing adjacent the table 14 and supports a roll of unexposed paper 42. The unexposed paper 42 passes through an inlet 44 into the interior of the housing 12. The paper extends horizontally through the housing beneath the table 14 and emerges from an outlet 46. A second magazine 48 is removably coupled to the other end of the housing adjacent the table 14 and receives the paper 42 via the outlet 46.

Figure 2:
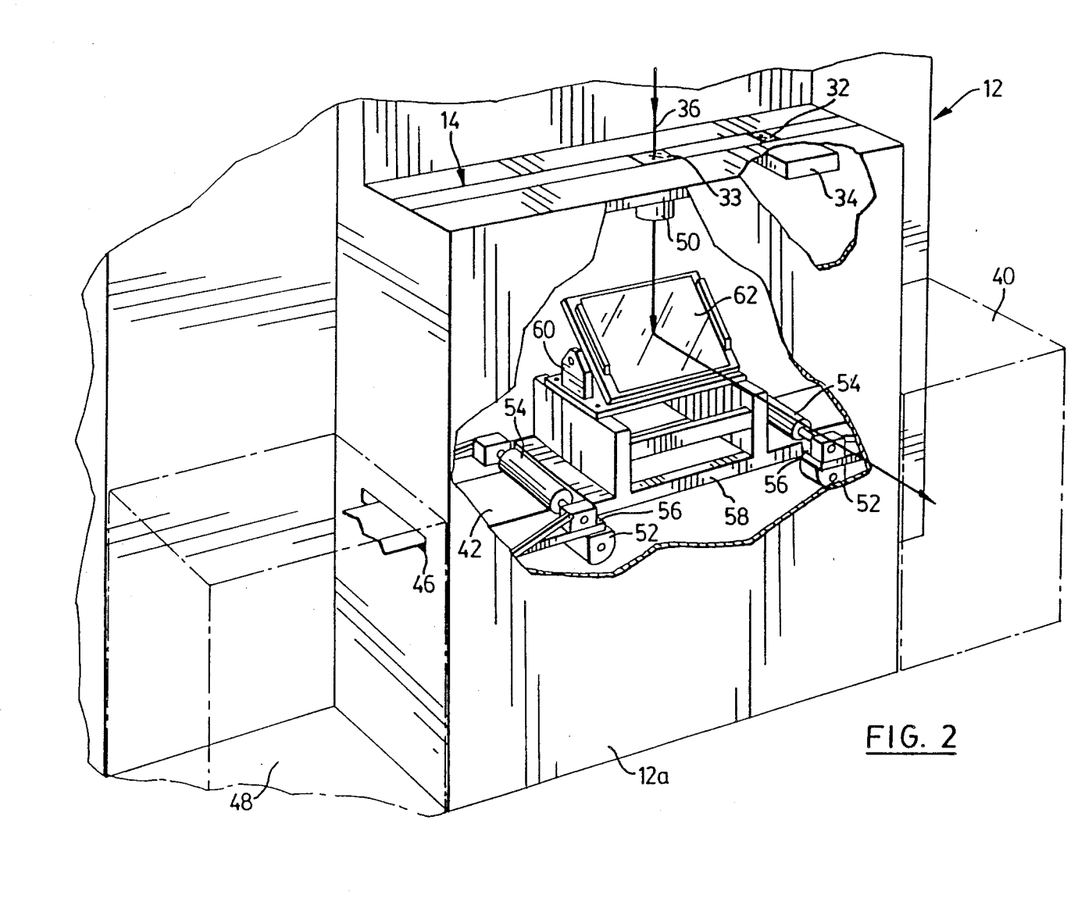
FIG. 2 is a perspective view of a portion of the devices shown in FIG. 1.
Figure 3:
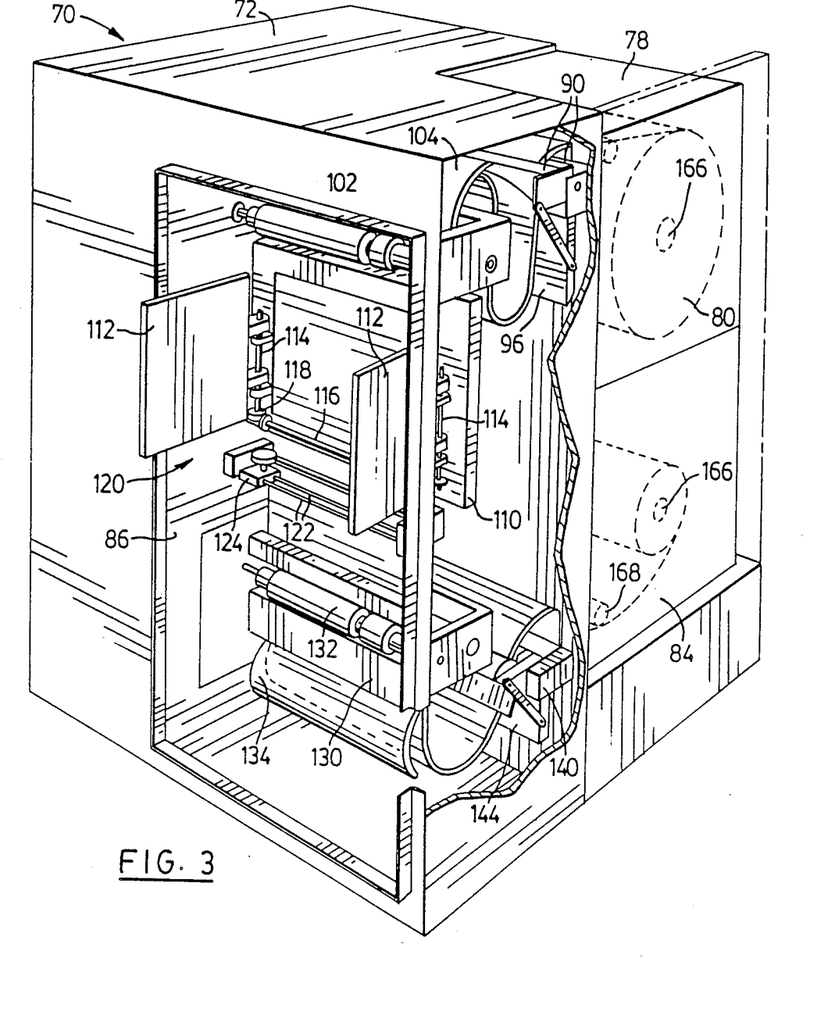
FIG. 3 is a perspective view of the apparatus shown in FIG. 1.

Referring now to FIG. 2, the interior of the housing 12 beneath the table 14 is better illustrated. An interchangeable lens 50 is provided in the housing 12 and is disposed directly below the aperture 33. The lens 50 receives the light beam 36 generated by the light source 31 and focusses the light beam so that a clear exposure of the scanned negative 24a can be formed by the device 10. Supports 52 are connected to opposite walls of the housing beneath the inlet 44 and outlet 46 respectfully and extend into the housing. Pairs of rollers 54 which are rotated via a drive motor (not shown) are mounted on the supports 52. The paper 42 passes between the rollers 54 in each pair so that when the rollers are rotated via the drive motor, the paper 42 is advanced through the housing 12.

The supports 52 project into the housing slightly beyond the rollers 54 to define ledges 56. A paper guide 58 extends across the ledges 56 and supports the lower surface of the paper 42 directly beneath the lens 50. The upper surface of the paper 42 is free from support to allow the focussed light beam 36 to form an exposure of the negatives 24a on the paper. A support frame 60 having a mirror 62 mounted thereon is removably supported by the paper guide 58. The mirror 62 is inclined at a 45° to the horizontal so that the light beam 36 is reflected towards the removable front wall 12a of the housing when the support 60 is placed on the paper guide 58.

Figure 1:
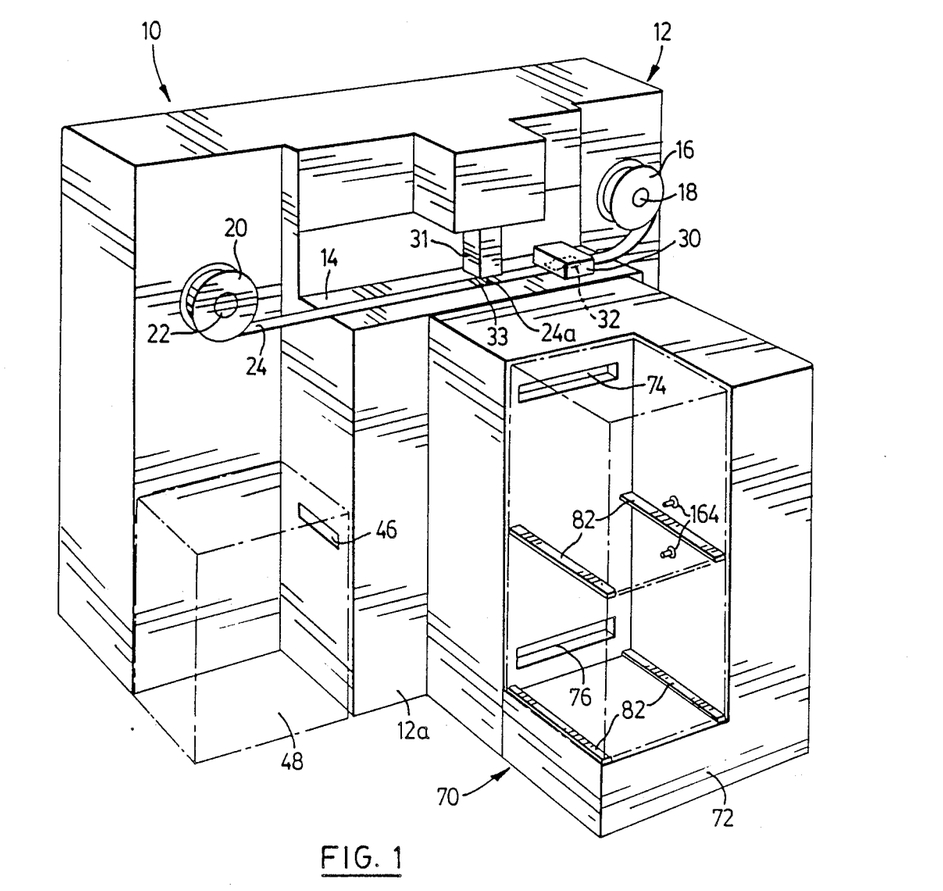
FIG. 1 is a perspective view of a photo-processing device including an apparatus for forming enlarged exposures of negatives.

As can be seen in FIG. 1, an enlargement apparatus 70 is adapted to be removably coupled to the front of the housing 12 when the front wall 12a is removed. The apparatus 70 can be uncoupled from the device 10 and replaced with the front wall 12a and the mirror 62 and support frame 60 can be removed from the housing 12 to allow the device 10 to operate in the conventional manner. The apparatus 70 includes a housing 72 having an inlet 74 and an outlet 76. A magazine 78 houses an unexposed roll of paper 80 having dimensions larger than the paper roll 42 and is supported on guide rails 82 mounted on the walls of the housing 72. The magazine 78 feeds the paper 80 through the inlet 74 and into housing 72. The paper 80 passes vertically through the housing 72 and emerges from the outlet 76 wherein it is received by another magazine 84. Similarly, the magazine 84 is supported by a pair of guide rails 82 mounted on the housing 72. The guide rails 82 are of the conventional draw assembly type to facilitate movement of the magazines towards and away from the housing 72.

Referring now to FIGS. 3, 4a to 4c and 5, the interior of the housing 72 is better illustrated. As can be seen, the interior of the housing is divided into two separate compartments via a wall 86. One of the compartments receives the paper 80 and the other compartment, which is not illustrated, houses drive motors and transmission components for operating the components housed in the one compartment. A pivotal roller support 88 extends across the one compartment and is positioned adjacent the inlet 74. A pair of pivotal rollers 90 are mounted on the support 88 and receive the paper 80 therebetween as it enters the housing 72. The rollers 90 are coupled to a motor (not shown) located in the other compartment so that they may be rotated to advance the paper 80. A sensor pair 92 is mounted on the wall 86 below the rollers 90 and functions to detect slack in the paper. The sensor pair 92 is in communication with the motor driving the rollers 90 and provides signals thereto to control its operation.

Figure 4A:
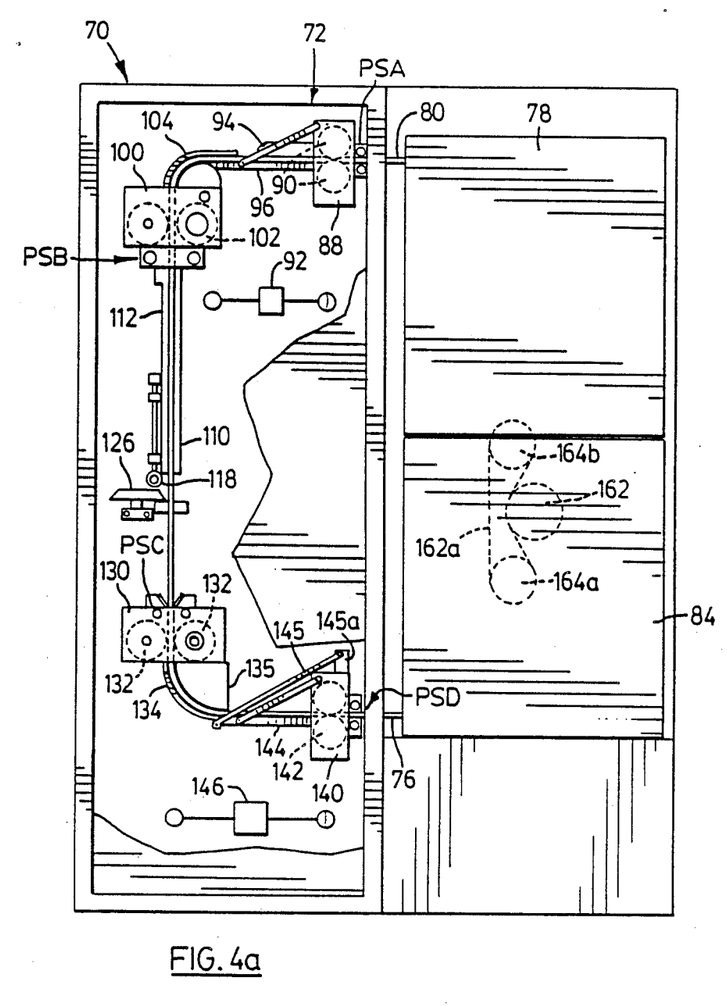
FIG. 4a is a side view of the apparatus shown in FIG. 3 in a first mode of operation.
Figure 4B:
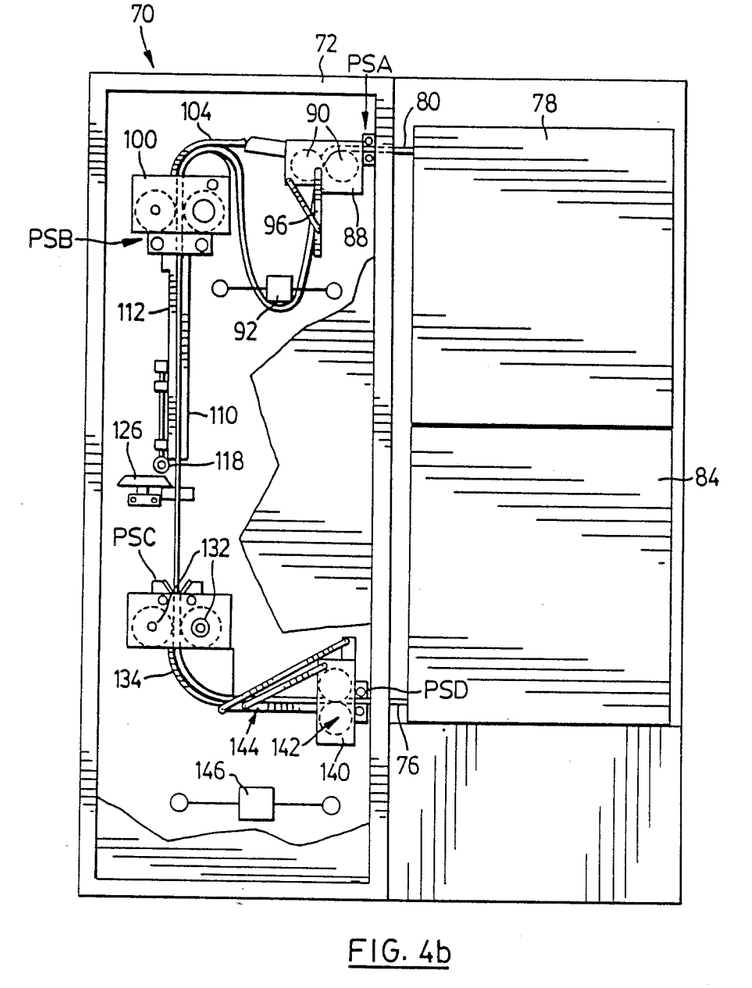
FIG. 4b is a side view of the apparatus shown in FIG. 3 in a second mode of operation.

A guide flap 94 extends from the support 88 away from the inlet 74 and a second guide flap 96 depends from the support 88 as shown in FIG. 4b. The guide flaps 94 and 96 are pivotable to assume a horizontal position as shown in FIG. 4a when the support 88 is pivoted.

A second roller support 100 is also provided in housing 12 and extends across the one compartment. Similarly, a pair of rollers 102 are mounted on the support 100 and receive the paper 80 therebetween. The rollers 102 are coupled to a motor (not shown) located in the other compartment so that they may be rotated. A curved guide flap 104 projects from the top of the support 100 towards the guide flap 94. The guide flaps 94 and 104 are interconnected so that when the guide flap 94 is pivoted to assume a horizontal orientation, the guide flap 104 is biased to the position shown in FIG. 4a. Accordingly, as shown in FIG. 4a, the guide flaps 94, 96, 104 provide a substantially confined horizontal path for the paper 80 when the support 88 is pivoted so that the rollers 90 are disposed one above the other but allow slack to be developed in the paper 80 when the support 88 is in the position shown in FIGS. 4b and 4c.

Figure 5:
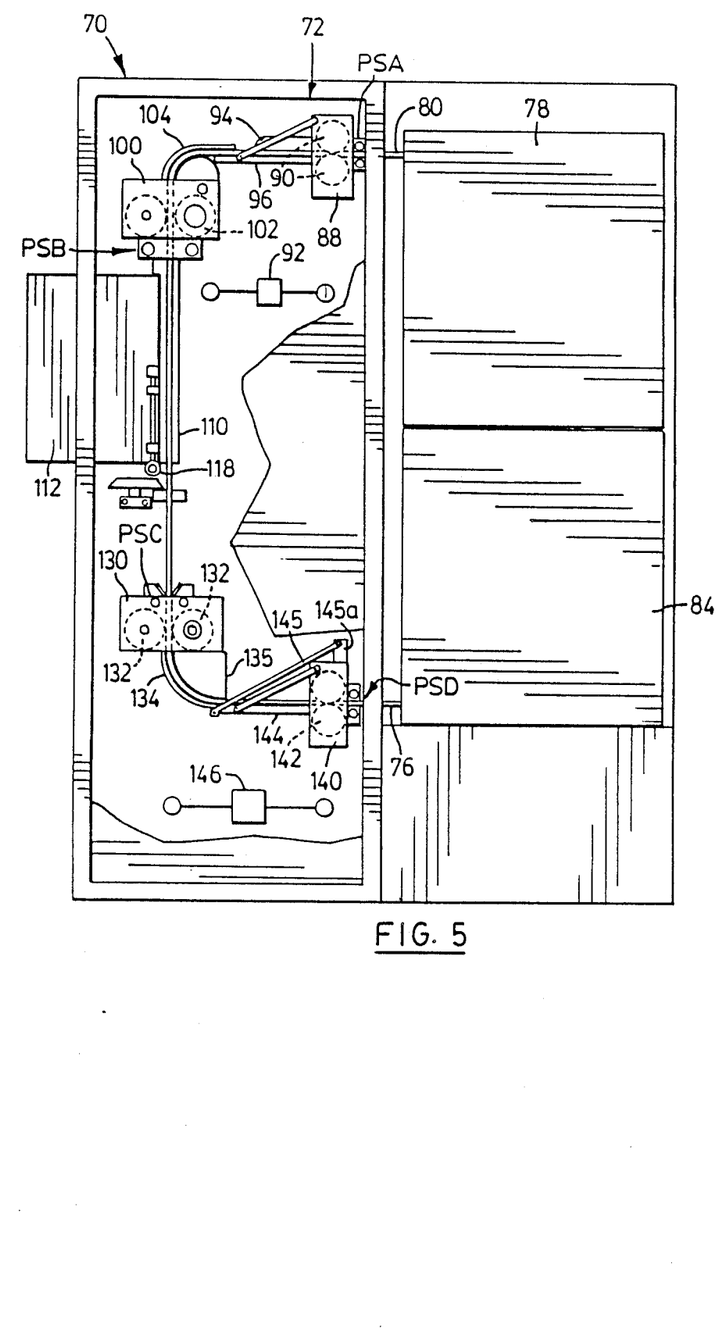
FIG. 5 is still yet another side view of the apparatus illustrated in FIG. 3 in a fourth mode of operation.

A paper guide 110 extends downwardly from the support 100 and includes a continuous back wall which supports the paper 80 as it passes vertically through the housing 72. The front wall of the paper guide 110 has a portion of its surface removed to expose one side of the paper 80 to the interior of the housing 12. The dimensions of the removed portion of the front wall correspond substantially to the dimensions of the enlarged exposures of the negatives to be made in the apparatus 70. A pair of doors 112 are positioned on either sides of the front wall of the paper guide 110 with each door being mounted on a rotatable shaft 114. The doors 112 are movable between open and closed positions as shown in FIGS. 4a and 5 so that the one side of the paper 80 can be concealed. The lower end of each of the shafts 114 is connected to a drive shaft 116 via a gear assembly 118. The drive shaft 116 extends across the one compartment and is coupled at one end to a motor located in the other compartment. When the drive shaft 116 is rotated, the gear assemblies 118 transmit the rotation through the shafts 114 thereby moving the doors 112.

A cutting assembly 120 is disposed below the doors 112. The assembly 120 comprises a pair of threaded shafts 122 that extend across the one compartment and are coupled at one end to a motor in the other compartment. The shafts 122 support a platform 124 that is movable along the shafts as they are rotated. The platform 124 has a circular cutting blade 126 mounted thereon which contacts and cuts the paper 80 as the platform 124 moves along the shafts 122.

A third roller support 130 similar to the roller support 100 is disposed below the paper guide 110. A pair of rollers 132 are mounted on the support 130 and receive the paper 80 therebetween. The rollers 132 are coupled to the motor which drives rollers 102 via a belt so that the two pairs of rollers 102 nd 132 respectively rotate in unison when the drive motor is operated. A curved guide flap 134 operable in first and second positions depends from the support 130. A stationary paper guide 135 also depends from the support 130.

Figure 4C:
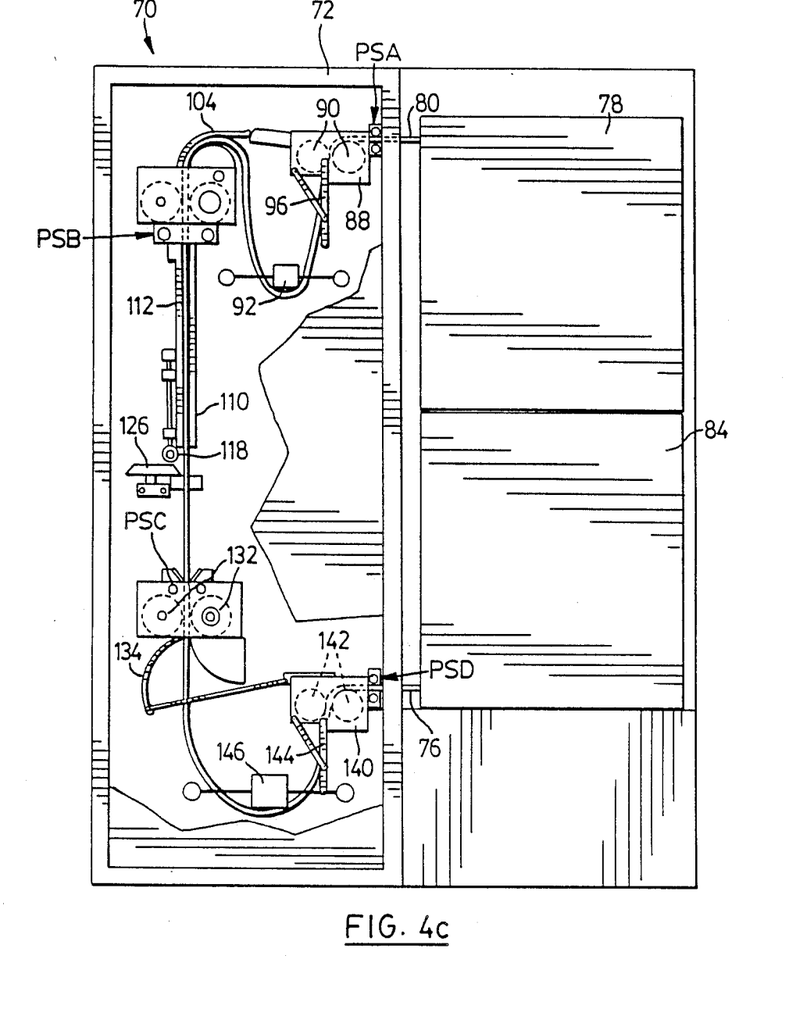
FIG. 4c is another side view of the apparatus illustrated in FIG. 3 in a third mode of operation.

Another pair of rollers 142 are mounted on a pivotable support 140 similar to support 88. The rollers 142 receive the paper 80 from the rollers 132 and feed the paper through the outlet 76 and into the magazine 84. The rollers 142 are coupled to a motor in the other compartment at one end so that they may be rotated to advance the paper. A guide flap 144 similar to guide flap 96 extends downwardly from the support 140 as shown in FIG. 4c but is pivotal as shown in FIGS. 4b and 4c when the support 140 is pivoted to position the rollers 142 one above the other. A linkage 145 extends from a bar 145a projecting from the support 140 and interconnects the guide flap 134 and the support guide flap 134 is moved between operative and inoperative positions when the support 140 is pivoted between its two operating positions. A sensor pair 146 in communication with the motor driving rollers 142 is disposed below the support 140 and detects slack in the paper 80.

A plurality of paper sensors PSA to PSD are positioned along the path followed by the paper 80 as it passes through the apparatus 70. The sensors are located adjacent each roller pair disposed in the housing 72 and function to detect the paper web 80 so that its path through the apparatus 70 can be monitored.

Figure 6:
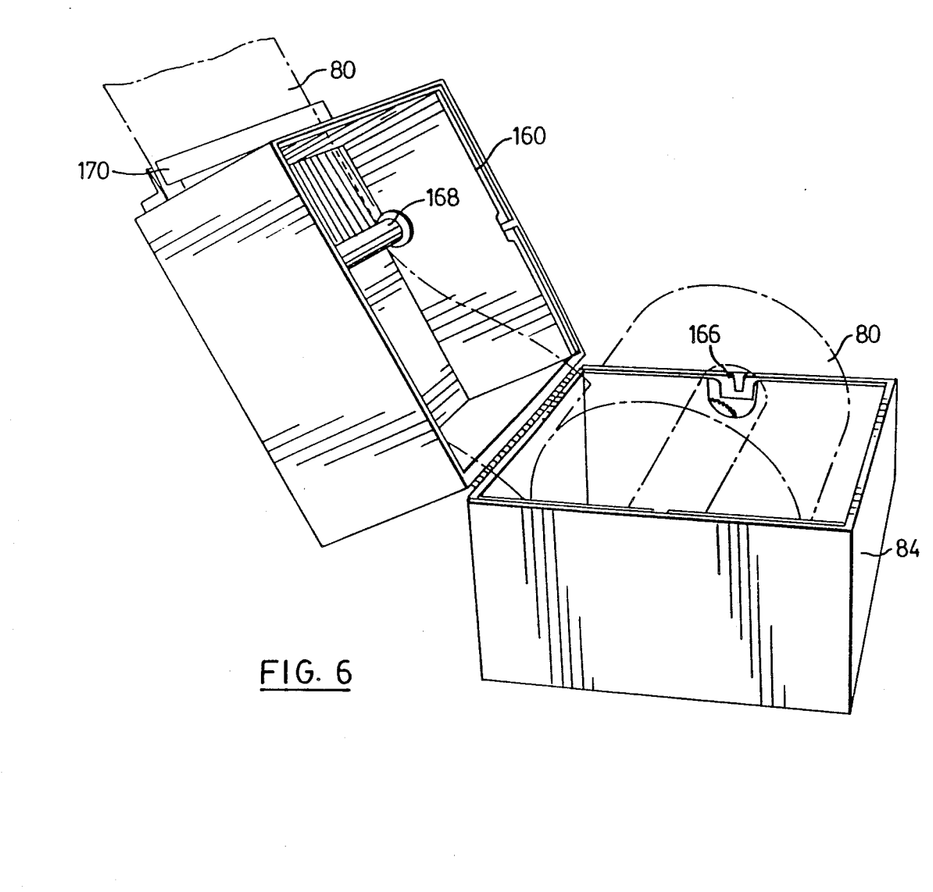
FIG. 6 is a perspective view of another portion of the apparatus shown in FIG. 3.

Referring now to FIGS. 4a and 6, one of the magazines 84 is shown although both magazines 78, 84 are substantially identical. The magazines include a lid 160 that is movable between open and closed positions to allow the paper 80 to be inserted or removed from the magazines. A toothed timing gear 162 is mounted on the outside of the magazine 84 and mates with a toothed belt 162a when the cartridge is positioned in the apparatus 70. The belt 162a loops around shafts 164a and 164b protruding from the wall 86 of the housing 72. The shaft 164a is coupled to a motor located in the other compartment so that it may be rotated. When the gear 162 is in abutment with the belt 162a, the shaft 164b is pulled downwards. A spring (not shown) biases the shaft 164b upwards against its downward movement to maintain the belt 162a taut around the shafts. The shaft 164a is coupled to the roller 166 located in the magazine 84 so that rotation of the shaft 164b is translated to the roller 166 via shaft 164a and belt 162a. The magazine also includes a guide roller 168 and a paper guide 170 placed on the lid 160. The roller 168 directs the paper towards the outlet of the magazine and the guide 170 directs the paper 80 to the inlet 74. The guide 170 extends into the inlet 74 to form a seal between the magazine 84 and the housing 72 so that undesired light does not enter into the housing 72.

The operation of the device 10 in conjunction with the apparatus 70 will now be described. In operation, when a negative is to be exposed, the reel 16 holding the exposed film is placed on the shaft 18. The strip of negatives 24 is then fed along the table 14 to the take-up reel 20 so that each negative 24a passes beneath the light source 30. As each negative 24a passes beneath the light source 30, the negative is scanned with a light beam which is received by the film scanning device 34 via the aperture 32. The film scanning device 34 scans the negative and conveys information to the computer concerning the quality of the negative. The computer analyses the information received from the film scanning device 34 and conveys signals to the light source 31. The signals generated by the computer cause the light source 31 to generate a light beam 36 for a pre-determined time for the scanned negative 24a the time being set so that the exposure time of the negative results in an optimum exposure of the negative being formed on one of the supplies of paper 42 or 80 respectively.

When the scanned negative 24a passes under the light source 31, the light beam 36 passes through the negative and the aperture 33 wherein it is received by the focussing lens 50. The focussing lens 50 is interchangeable with other lenses and is chosen depending on the size of the exposure to be made. If a conventional exposure is to be formed, the mirror 62 and support 60 are removed from the housing 12 and the appropriate focussing lens 50 is chosen. The focussing lens 50 focusses the light beam 36 so that it impinges on the paper 42 directly below the aperture 33. Thus, an exposure of the negative 24a is formed on the paper 42. Once this is done and the light source 31 has been deactivated, the paper 42 is advanced through the housing 12 via the rollers using the GRETAG device logic so that when the next negative 24a on the strip of film 24 passes beneath the light source 31, an exposure of the negative 24a is formed on the next available blank portion of the paper 42.

When it is desired to form an enlargement of a single negative or an entire strip of film 24, the front wall 12a of the housing 12 is removed and the focussing lens 50 is replaced with another lens 50 which will focus the light beam 36 in a manner to form enlarged exposures. Following this, the mirror 62 and support 60 are placed on the paper guide 58 so that the mirror is located directly below the focussing lens 50. The apparatus 70 is then coupled to the device 10 in replacement of the wall 12a and forms a seal with the device 10 to prevent unwanted light from entering the housings 12, 72.

When the enlarged exposure of a negative 24a is to be formed, the light source 31 generates an optical beam 36 which passes through the negative 24a, the aperture 33 and into the focussing lens 50. The focussed optical beam emerging from the lens 150 is directed towards the mirror 62 which in turn reflects the optical beam 36 by approximately 90°. The focussed reflected beam 36 then passes into the housing 72, between the open doors 112 and impinges on the enlarged roll of unexposed paper 80 thereby forming an enlarged exposure of the negative thereon. After the light source 31 has been deactivated, the paper 80 is advanced via the rollers 90, 102, 132, 142 so that a blank portion of the paper 80 is located in the paper guide 110. Thus, when the next negative 24a to be exposed passes beneath the light source 31 and a light beam 36 is generated, an enlarged exposure of the negative is formed on the next available blank portion of the paper 80.

Initially when no magazines are positioned on the rails, the supports 88 and 140 and the flaps 90 and 144 are in the position illustrated in FIG. 4a. When the magazine 78 is firstly placed on the rails 82 so that the paper roll 80 extends out of the magazine outlet 170, the paper enters the housing 72 via the inlet 74. After the paper 80 passes into the housing, it is sensed by paper sensor PSA. When this occurs, the logic in the GRETAG device 10 energizes the motor coupled to roller assemblies 90, 100 and 132. This causes the roller assemblies to rotate so that the paper 80 is driven along the confined path defined by flaps 94, 96 and 104 from roller assembly 90 to roller assembly 102.

After the paper 80 is sensed by paper sensor PSB, the motors are deactivated causing the paper advancement in the housing 72 to stop. The roller support 88 is then pivoted to the position illustrated in FIG. 4b. When flap 96 is sensed as being in the fully open position by a micro-switch (not shown), the logic in GRETAG device 10 activates the motor driving rollers 90 so that slack in the paper 80 develops. The rollers 90 are rotated to advance the paper 80 until the slack is sensed by sensor pair 92. When this occurs, the motor driving rollers 90 is turned off so that the paper 80 remains stationary. The paper 80 remains in this position until a take-up magazine 84 is sensed as being properly positioned to accept paper 80.

When the logic in GRETAG device 10 is satisfied that a take-up magazine 84 is present, the motors driving roller assemblies 102, 132 and 142 are activated to advance the paper 80 through the apparatus 70. The paper 80 moves through the device via the confined path defined by flaps 134, 135 and 144 until it is sensed by paper sensor PSD. When this occurs, there is a time delay in the logic before stopping the roller rotation to allow the paper 80 to enter magazine 84 via the outlet 76. When rollers and hence the paper 80 stop moving, the roller support 140 is pivoted to position the flaps 134 and 144 in the manner illustrated in FIG. 4c. When the flaps 134 and 144 are sensed as being in the fully open position, the stepper motor which drives roller assemblies 102 and 132 is rotated to advance the paper 80 until slack is sensed by sensor pair 146.

After this, sensor pair 92 activates the drive motor for roller assembly 90 so that a slack loop of paper 80 is maintained in the housing 72. Sensor pair 146 also activates the drive motor for roller assembly 142 when paper is sensed between sensors 146.

When a complete strip of film 24 has been exposed and the take-up reel 20 is removed from the shaft 22, the computer conveys information to the motors operating the doors 112 and the cutter assembly 120. The information causes the motor to rotate the shaft 116 so that the shafts 114 are rotated via gears 118 thereby closing the doors 112 to conceal the paper from the light beam 36. With the doors 112 closed, the shafts 122 are rotated thereby advancing the platform 124 and hence, the cutter 126 along the shafts. The cutter 126 in turn cuts the paper. When it is sensed that the cutter 126 has finished cutting the paper 80, the drive motors for roller assemblies 102, 132 and 142 are turned on to advance the paper 80. Where the cut in the paper is sensed at paper sensor PSC, the drive for roller assemblies 102 and 132 is turned off. The drive for roller assembly 142 is then turned on to advance the lower portion of the cut paper towards the magazine 84 until paper sensor PSD does not detect any paper. At this point, the magazine 84 is removed from apparatus 70 and the exposed paper is processed. Following this, the device 70 resets so that the lower loop flaps 134, 144 assume the position shown in FIG. 4b. When a new magazine 84 is sensed as being coupled to the outlet 76, the paper loading sequence is repeated to advance the paper 80 passed paper sensors PSC and PSD and into the outlet via the confined path defined by the guide flaps. The doors 112 are then driven to an open position to ready the apparatus for forming more enlarged exposures.

Accordingly, the present apparatus allows enlargements of negatives to be formed easily and inexpensively without physically altering an existing photo-processing device. It should be apparent to those of skill in the art that modifications and variations can be made to the present invention without departing from the scope thereof as defined by the appended claims.

We claim:

1. An apparatus adapted to be coupled to a photo-processing device, said photo-processing device for forming exposures of negatives of a pre-determined size, said apparatus comprising:
   a housing receiving a supply of unexposed paper;
   drive means for advancing said paper through said housing upon exposure of a negative thereon; and
   reflection means positioned in said photo-processing device, said reflection means receiving a focussed light beam after said light beam has passed through a negative and directing said focussed light beam into said housing and onto said paper to form an exposure of said negative of a size different than said pre-determined size.

2. An apparatus as defined in claim 1 wherein said reflection means comprises a single mirror removably supported in said photo-processing device.

3. An apparatus as defined in claim 2 wherein said mirror forms an angle of approximately 45° with respect to a horizontal axis and said supply of paper advances through said housing in a path substantially perpendicular to said horizontal axis, said light beam being reflected by said mirror so that it follows a path substantially parallel to said axis to impinge on said paper.

4. An apparatus as defined in claim 3 wherein said supply of paper is in the form of a continuous paper roll and said housing includes an inlet for receiving said paper roll and an outlet for dispensing said paper roll.

5. An apparatus as defined in claim 4 further comprising a pair of magazines, one of said magazines being positioned adjacent said inlet and housing said paper roll prior to an exposure being formed thereon and the other of said magazines positioned adjacent said outlet and receiving said paper after exposures have been formed thereon.

6. An apparatus as defined in claim 5 wherein said magazines are disposed one above the other and are removably supported on draw assembly guides, said guides facilitating the removal and coupling of said magazines to said apparatus.

7. An apparatus as defined in claim 5 wherein said drive means includes a plurality of roller pairs and paper guide means disposed in said housing along the path of said paper roll, said roller pairs receiving said paper roll therebetween and advancing said paper roll through said housing via said guide means upon rotation thereof.

8. An apparatus as defined in claim 7 wherein said roller pairs and paper guide means operate to advance automatically said paper roll from said one magazine through said housing to said other magazine upon replacement of one of said magazines.

9. An apparatus as defined in claim 8 wherein said paper guide means comprises a substantially vertical guide having one continuous surface and another surface having a portion thereof removed to allow said light beam to impinge on said paper roll, said guide directing said paper roll and supporting a pair of doors operable between open and closed positions, said doors concealing said portion upon the operation thereof to said closed position.

10. The apparatus as defined in claim 9 wherein said guide means further comprises upper and lower sets of pivotal guide flaps, said upper set of guide flaps extending from said inlet to said paper guide and said lower set of guide flaps extending from said paper guide to said outlet, each of said sets of guide flaps being operable between first and second positions, in said first position said flaps allowing slack to develop in said paper roll and in said second position said flaps being in a substantially horizontal orientation to define a confined path for said paper roll.

11. An apparatus as defined in claim 4 further comprising a cutter operable to cut said continuous paper roll.

12. A photo-processing device capable of forming different size exposures of a negative comprising:
   a light source for generating a light beam to be directed through a negative;
   a housing receiving said light beam after it has passed through said negative, said housing receiving supplies of first and second unexposed paper, one supply of paper having larger dimensions than the other;
   focussing means receiving said light beam after it has passed through said negative and being operable in first and second modes;
   reflection means movable from an operative to an inoperative position, in said inoperative position, said focussing means being operable in said first mode so that said light beam is focussed directly onto said first supply of paper to form an exposure of a first size of said negative thereon and in said operative position, said focussing means being operable in said second mode, said reflection means reflecting said focussed light beam onto said second supply of paper to form an exposure of a second size, said negative thereon; and
   drive means operable to advance said first supply of paper through said housing in said first mode and to advance said second supply of paper through said housing in said second mode upon exposure of a negative thereon.

13. A device as defined in claim 12 wherein said second supply of paper is larger than said first supply of paper and wherein said focussing means comprises a pair of interchangeable lenses, each lens being associated with a pre-determined size of exposure and focussing said light beam properly to form said exposure and one of said first or second supplies of paper.

14. A device as defined in claim 13 wherein said reflection means comprises a single mirror, said mirror being removed from said housing in said inoperative mode and placed in said housing in said operative mode.

15. A device as defined in claim 14 wherein said mirror forms an angle of approximately 45° with respect to a horizontal axis and said second supply of paper advances through said housing in a path substantially perpendicular to said horizontal axis, in said operative mode, said light beam being reflected by said mirror so that it follows a path substantially parallel to said axis to impinge on said second supply of paper.

16. A device as defined in claim 15 wherein said supplies of paper are in the form of continuous paper rolls and said housing includes inlets for receiving said paper rolls and outlet for dispensing said paper rolls.

17. A device as defined in claim 16 further comprising two pairs of magazines, one magazine of each pair being positioned adjacent one of said inlets and housing one of said first and second paper rolls prior to being exposed and the other magazine of said pairs being positioned adjacent one of said outlets and receiving said respective first and second paper roll after exposures have been formed thereon.

18. A device as defined in claim 17 wherein said magazines associated with said second paper roll are disposed one above the other and are removably supported on draw assembly guides, said guides facilitating the removal and coupling of said magazines to said device.

19. A device as defined in claim 18 wherein said drive means for advancing said second paper roll includes a plurality of roller pairs and paper guide means disposed in said housing along the path of said second paper roll, said roller pairs receiving said second paper roll therebetween and advancing said paper roll through said housing via said guide means upon rotation thereof.

20. A device as defined in claim 19 wherein said roller pairs and paper guide means operate to advance automatically said second paper roll from said respective one magazine through said housing into said magazines of said pair.

21. A device as defined in claim 20 wherein said paper guide means comprises a substantially vertical guide having one continuous surface and another surface having a portion thereof removed to allow said light beam to impinge on said paper roll, said guide directing said paper roll and supporting a pair of doors operable between open and closed positions, said doors concealing said portion upon the operation thereof to said closed position.

22. A device as defined in claim 21 wherein said guide means further comprises upper and lower sets of pivotal guide flaps, said upper set of guide flaps extending from said inlet to said paper guide and said lower set of guide flaps extending from said paper guide to said outlet, each of said sets of guide flaps being operable between first and second positions, in said first position said flaps allowing slack to develop in said second paper roll and n said second position said flaps being in a substantially horizontal orientation to define a confined path for said second paper roll.

23. A device as defined in claim 16 further comprising a pair of cutters each of which is operable to cut one of said first and second paper rolls.

* * * * *